United States Patent
Huang et al.

(10) Patent No.: US 10,674,331 B1
(45) Date of Patent: Jun. 2, 2020

(54) INDOOR LOCATION ESTIMATION FOR WIRELESS DEVICE

(71) Applicant: Amazon Technologies, Inc., Seattle, WA (US)

(72) Inventors: Rongsheng Huang, San Jose, CA (US); Shao-Cheng Wang, Santa Clara, CA (US); Jungtao Liu, Saratoga, CA (US); Koohyun Um, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/299,744

(22) Filed: Mar. 12, 2019

(51) Int. Cl.
*H04W 4/029* (2018.01)
*H04W 4/33* (2018.01)
*G01S 5/02* (2010.01)
*G01S 1/70* (2006.01)

(52) U.S. Cl.
CPC .............. *H04W 4/33* (2018.02); *G01S 1/70* (2013.01); *G01S 5/0284* (2013.01); *H04W 4/029* (2018.02)

(58) Field of Classification Search
CPC .......... H04W 4/33; H04W 4/029; G01S 1/70; G01S 5/0284
See application file for complete search history.

(56) References Cited

U.S. PATENT DOCUMENTS

| 2015/0222602 | A1* | 8/2015 | Steiner | H04L 63/0428 713/168 |
| 2017/0374513 | A1* | 12/2017 | Venkatraman | H04B 17/11 |
| 2018/0227874 | A1* | 8/2018 | Sirotkin | G01S 5/00 |

* cited by examiner

Primary Examiner — Chuong A Ngo
(74) Attorney, Agent, or Firm — Lowenstein Sandler LLP (57) ABSTRACT

Technology for indoor location estimation of wireless stations is described. In one embodiment, a processing device identifies a plurality of wireless stations that support a signal round-trip-time measurement protocol. The processing device associates the plurality of wireless stations with one another to form a logical grouping of the plurality of wireless stations and provides an indication of the plurality of wireless stations in the logical grouping to each of the plurality of wireless stations. The processing device receives a first round-trip-time measurement value for a signal transmitted between a first wireless station and a second wireless station of the logical grouping and a second round-trip-time measurement value for a signal transmitted between the first wireless station and a third wireless station of the logical grouping. These round-trip-time measurement values indicate a distance between the wireless stations, respectively. The processing device determines, using the first distance and the second distance, a position of the first wireless station relative to the second wireless station and the third wireless station.

20 Claims, 6 Drawing Sheets

INDOOR LOCATION ESTIMATION FOR WIRELESS DEVICE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technology for indoor location estimation of a wireless communication device is described herein. The Institute of Electrical and Electronics Engineers (IEEE) 802.11 standard is commonly used to implement wireless local area network (WLAN) communication, (i.e., Wi-Fi). Newer versions of the 802.11 standard support the Fine Timing Measurement (FTM) protocol which can be used to determine distances between 802.11 enabled devices based on time-of-flight (TOF) measurements. Using FTM, a requesting device exchanges FTM frames with a responding device to measure the time-of-flight (TOF) or the Round Trip Delay (RTD/2). The requesting device can compute its distance from the responding device after receiving timing measurement values (i.e., timestamps corresponding to the departure time and arrival time of the FTM frames) from the responding device. Thus, if the requesting device is within range of multiple responding devices (e.g., three or more responding devices, such as wireless access points), the requesting device can perform an FTM frame exchange with each of the responding devices to determine a distance between the requesting device and each of the responding devices. The requesting device can then use trilateration to determine its location relative those responding devices.

In conventional WLAN communication systems, the FTM frame exchange is performed using public action frames. Thus, although a requesting device, such as a wireless station (STA), traditionally may perform the FTM frame exchange with a responding wireless access point (AP), the association with an access point is not technically required. Any pair of wireless stations and/or access points that supports certain versions of 802.11 communications is able to fulfill either the role of the requestor or the responder in the FTM frame exchange procedure. For example, if a first wireless station sends a FTM request to a second wireless station, the second wireless station can provide a FTM response completing the FTM procedure and allowing the first wireless station to determine a distance between the first and second stations based on the received timing information in the FTM response.

In an infrastructure wireless network, however, a wireless station can only tell if an access point supports the FTM protocol since beacons broadcast by the access point generally include an FTM support indicator. Since the other wireless stations in the network don't broadcast such beacons to advertise themselves as supporting the FTM protocol, a requesting wireless station may not know which other stations can serve as responders. Thus, conventionally, a wireless station can only perform the FTM procedure with surrounding access points. In public venues, such as a shopping mall, corporate office, school campus, etc., where many public access points may be present, the FTM procedure can still be well leveraged by a single requesting wireless station since three or more surrounding access points are generally required to obtain an accurate location. In private residential venues, such as apartments or houses, however, such a limitation can make the FTM procedure a less viable solution. Thus, in order to make use of the FTM feature of the 802.11 standard in residential venues or houses, the dependency on access points can be removed to allow wireless stations to perform the FTM procedure with each other and derive their position information.

A number of existing solutions attempt to achieve the above described goal but each has a certain disadvantages. For example, a wireless station may be configured as a soft access point and will broadcast beacons including an FTM support indicator. Thus, when one wireless station is associated with another station that is configured as a soft access point, the FTM exchange can be completed. This approach, however, requires additional associations between stations and the soft access points making this approach very cumbersome when the number of FTM devices is large. In other situations, a peer-to-peer (P2P) arrangement can be established between a group owner and a P2P client device. The two devices function as a group that must be associated with each other before data sharing can occur. Therefore, in order to fulfil the FTM procedure between stations (i.e., non-access points), one of the stations has to act as the group owner. Since each P2P group includes only two devices, only one client can talk to the group owner at time, thus requiring an unwieldy number of P2P groups to be formed in order to determine position information. Finally, WiFi Aware is based on a concept of groups consisting of equivalent devices. Once the WiFi Aware group is formed, each node in the group can obtain the knowledge of which other nodes support the FTM feature. This solution, however, requires all the involved devices to support WiFi Aware, as well as FTM, and to form a WiFi Aware group to utilize the FTM feature.

Aspects of the present disclosure address the above and other considerations by alternative methods of determining which wireless stations support the FTM feature. The dependency on an access point to perform the FTM procedure is not actually mandated by the IEEE 802.11 specification. This conventional dependency originates from the general inability of one wireless station to determine whether other wireless stations support the FTM feature. As long as a wireless station can tell or determine whether the other wireless stations support the FTM feature, and a communication link can be maintained between the stations, two or more stations can directly perform the FTM frame exchange without depending on other devices, such as an access point. In one embodiment, a cloud service, for example, identifies a group of wireless stations in a particular venue, receives identifying information about the wireless stations (e.g., a model number) and maintains a mapping of those wireless stations to determine which support the FTM feature. Using the mapping, the cloud service can indicate to a certain requesting wireless station, which other wireless stations can serve as FTM responders for purposes of determining the location of the requesting station. In one embodiment, the cloud service can form one or more FTM groups including those wireless stations at the same venue that support the FTM procedure. Once a FTM group is formed, or at least once the support of the FTM feature among other wireless stations is determined, the one or more wireless stations perform the FTM frame exchange procedure, as will be described in detail below, and either one of the wireless stations or the cloud service can generate a relative position map to identify the relative locations of the one or more wireless stations within the venue. Knowing the relative locations can allow for any number of other features to be implemented. As used herein, a wireless station can include an access point or a non-access point device. Accordingly, an FTM group can include both access points and non-access points, depending on the embodiment. The formation of the FTM group, however, eliminates the requirement that at least one of the wireless stations in a pair performing the FTM exchange procedure be an access point, since it is known that all devices in the FTM group, including non-access point wireless stations support the FTM protocol. Further details of determining indoor location estimation for a wireless communication device are described below with respect to FIGS. 1-6.

Figure 1:
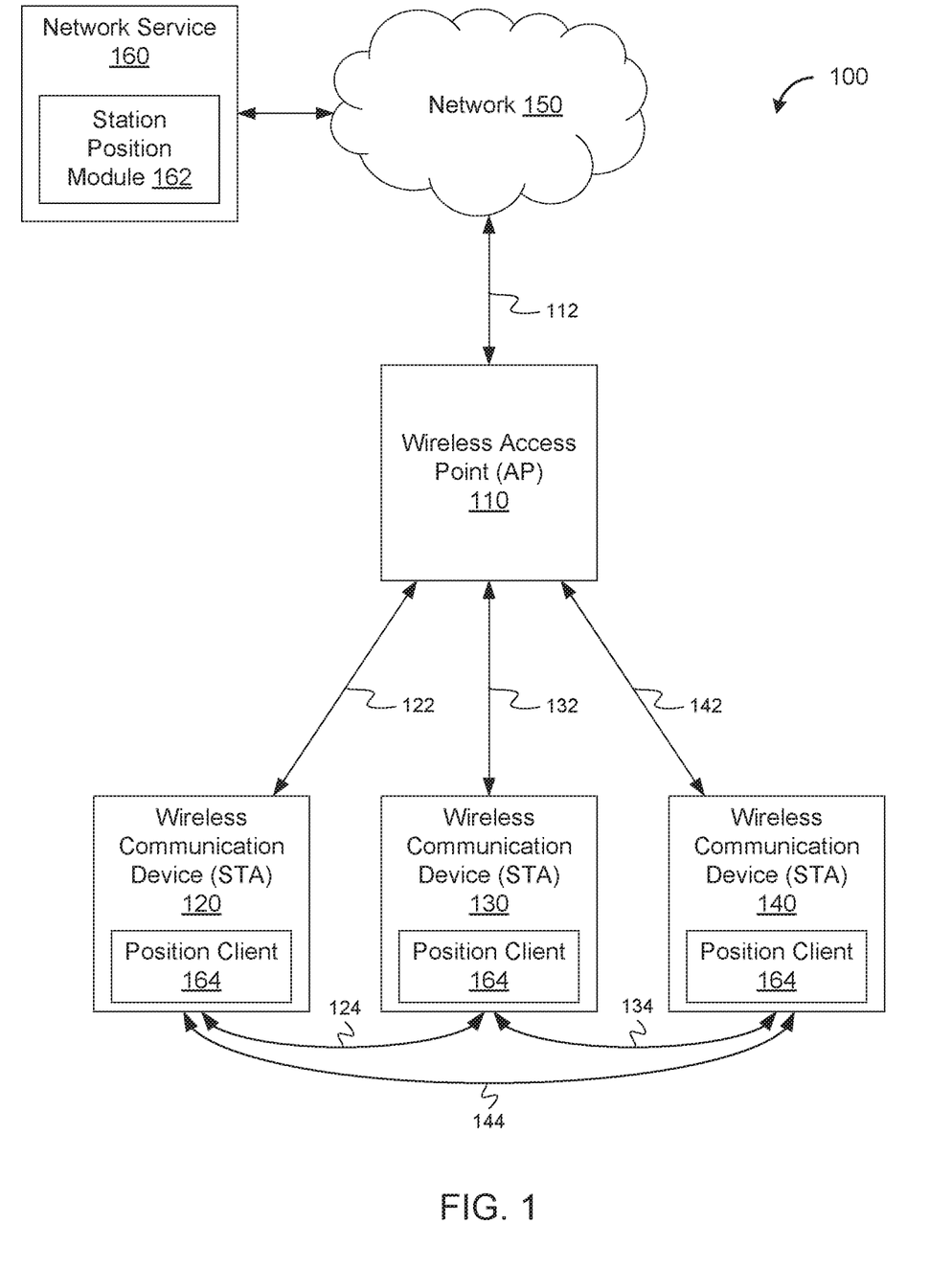
FIG. 1 is a block diagram illustrating an example configuration of a communication network architecture, according to an embodiment

FIG. 1 is a block diagram illustrating an example configuration of a communication network architecture 100, according to an embodiment. Within the communication network architecture 100, a carrier-based network such as an IEEE 802.11 compatible wireless access point is established by network equipment 110. The network equipment 110 may include a wireless access point, a Wi-Fi hotspot, or other similar device communicating with wireless communication devices 120, 130, and 140. Each of wireless communication devices 120, 130, and 140 may also be referred to as a user equipment (UE) or a communication station (STA). The carrier-based network includes wireless network connections 122, 132, and 142 between the network equipment 110 and the wireless communication devices 120, 130, and 140, respectively, and wireless network connections 124, 134, and 144 between the wireless communication devices 120, 130, and 140, directly. Depending on the embodiment, the wireless communication devices 120, 130, and 140 may include, for example, a smartphone, a mobile phone handset, a personal computer having an integrated or external wireless network communication device, a smart speaker, a tablet computer, a smart television, or any other network connected device.

The network equipment 110 is illustrated in FIG. 1 as being connected via a network connection 112 to a communications network 150. The communications network 150 may provide access to any number of network resources that operate to provide various types of information to, or receive information from, wireless communication devices 120, 130, and 140, including device location information, user profiles, user information, web sites, e-mail, and the like. For example, a network service 160 (e.g., a cloud service) may run on a server or other set of one or more computing devices connected to network 150. Network service 160 may include station position module 162, which works independently or in connection with one of station position clients 164 on wireless communication devices 120, 130, and 140, to enable the determination of the location of the various wireless communication devices 120, 130, and 140, with respect to each other and/or with respect to the network equipment 110.

Wireless communication devices 120, 130, and 140 may communicate with the network equipment 110 when in range or otherwise in proximity for wireless communications. As illustrated, the connection 122 may be established between the wireless communication device 120 and the network equipment 110; the connection 132 may be established between the wireless communication device 130 and the network equipment 110; and the connection 142 may be established between the wireless communication device 140 and the network equipment 110. In addition, wireless communication devices 120, 130, and 140 may communicate directly with each other when in range or otherwise in proximity for wireless communications. As illustrated, the connection 124 may be established between the wireless communication device 120 and the wireless communication device 130; the connection 134 may be established between the wireless communication device 130 and the wireless communication device 140; and the connection 144 may be established between the wireless communication device 120 and the wireless communication device 140.

In one embodiment, the wireless connections 122, 132, and 142 between devices 120, 130, and, 140 and the network equipment 110 may utilize a Wi-Fi or IEEE 802.11 standard protocol. In other embodiments, the wireless connections 122, 132, and 142 may use some other wireless protocol, such as the current 3rd Generation Partnership Project (3GPP) long term evolution (LTE), or time division duplex (TDD)-Advanced systems. The wireless communication devices 120, 130, and, 140 may each include one or more antennas, receivers, transmitters, or transceivers that are configured to utilize a Wi-Fi or IEEE 802.11 standard protocol or a protocol such as 3GPP LTE, or TDD-Advanced or any combination of these or other communications standards. In one embodiment, the wireless connections 124, 134, and 144 between devices 120, 130, and, 140 may utilize the same Wi-Fi or IEEE 802.11 standard protocol or other protocols such as Bluetooth®, ZigBee, near field communications (NFC) or other protocol that supports time of flight measurements and/or the FTM feature.

The antennas in or on devices 120, 130, and, 140 may comprise one or more directional or omnidirectional antennas, including, for example, dipole antennas, monopole antennas, patch antennas, loop antennas, microstrip antennas or other types of antennas suitable for transmission of radio frequency (RF) signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to 1/10 of a wavelength or more.

Network equipment 110 may provide wireless communication services to wireless communication devices 120, 130, and 140. While the exemplary communication system 100 of FIG. 1 depicts only three wireless communication devices 120, 130, and 140, in other embodiments, any combination of multiple users, devices, servers and the like may be coupled to network equipment 110. For example, one or more users located in a venue, such as a building, house, or other area, and may utilize any number of wireless-enabled computing devices to independently communicate with network equipment 110. Similarly, communication system 100 may include more than one network equipment 110. For example, a plurality of access points or base stations may form an overlapping coverage area where wireless communication devices may communicate with at least two instances of network equipment 110.

Although communication system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors. DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
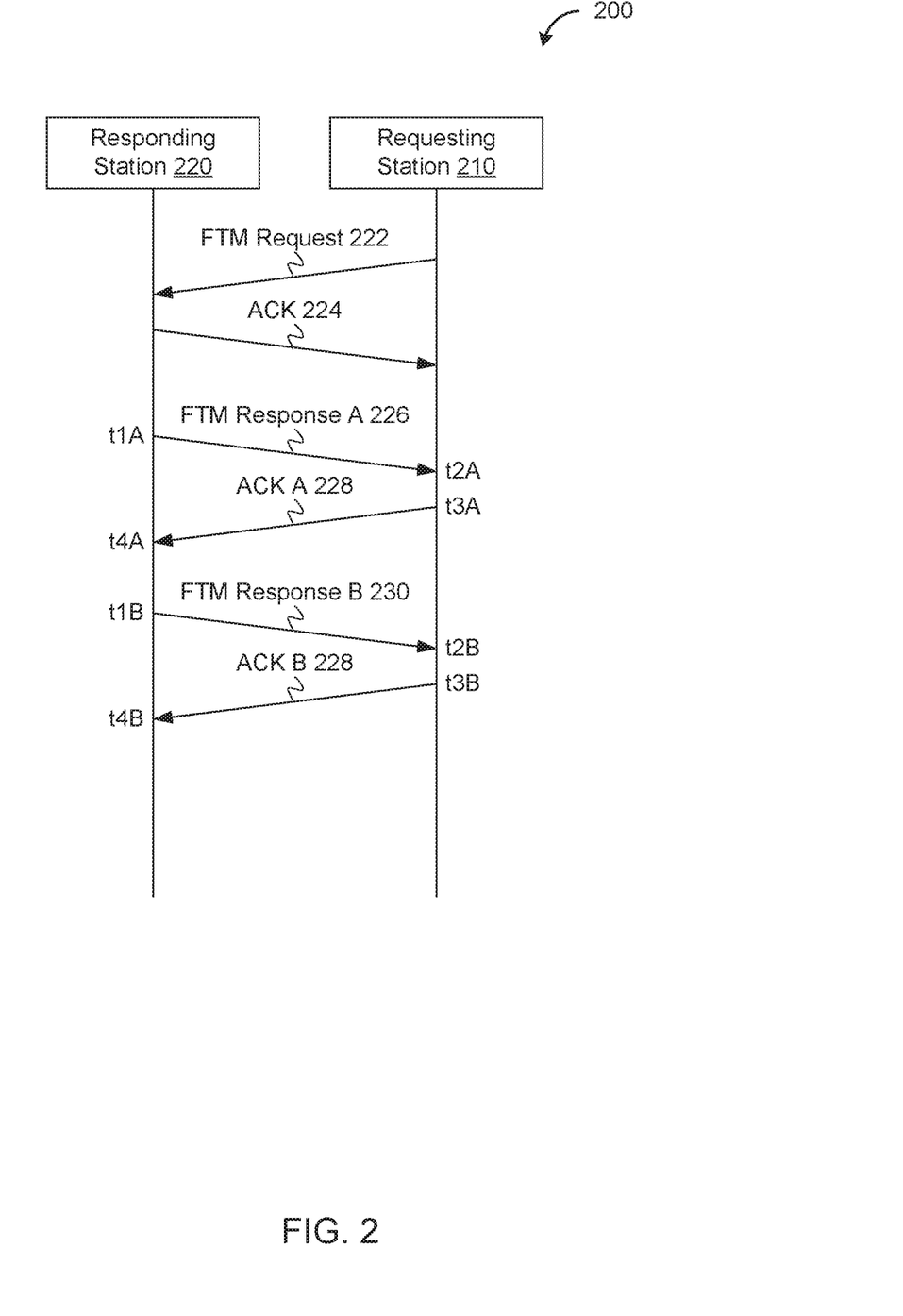
FIG. 2 is a sequence diagram illustrating a fine timing measurement (FTM) frame exchange procedure 200, according to an embodiment.

FIG. 2 is a sequence diagram illustrating a fine timing measurement (FTM) frame exchange procedure 200, according to an embodiment. The FTM procedure 200 allows requesting wireless station (STA) 210 (e.g., a wireless communication device) to accurately measure the Round Trip Time (RTT) between it and responding wireless station 220 (e.g., a station, access point, etc.). Requesting wireless station 210 and responding wireless station 220 may represent any one of wireless communication devices 120, 130, and 140 illustrated in FIG. 1. In one embodiment, the requesting station 210 transmits a FTM request 222 to a responding wireless communication device, such as responding wireless station 220. The responding wireless station 220 then generates and transmits an acknowledgment (e.g., ACK 224) to the FTM request 222 frame to the requesting wireless station 210.

In time, responding wireless station 220 will generate and send an FTM response to requesting station 210, which may be referred to as an "FTM response" or generally as a "response" or a "response to the FTM request frame." The response to the FTM request 222 frame may be generated and transmitted using any of a number of different means. In one example, the response to the FTM request 222 frame may be piggybacked within an FTM frame. In another example, the response to the FTM request 222 frame may be included within a block acknowledgement (BACK) frame. In yet another example, the response to the FTM request 222 frame may be an FTM acknowledgement (ACK) frame. In another example, the response to the FTM request 222 frame may be piggybacked onto or included within any other frame (e.g., besides an FTM frame) transmitted from the responding wireless station 220 to the other requesting wireless station 210 via the communication interface. Any desired form of response may be used to generate and transmit the response to the FTM request 222 frame to the requesting wireless station 210.

The requesting wireless station 210 and the responding wireless station 220 may then make various subsequent frame exchanges (e.g., FTM frames) including FTM Response A 226 and FTM Response B 230 and replies to the FTM frames/acknowledgements (ACKs) ACK A 228 and ACK B 232. The responding wireless station 220 transmits the FTM Response A 226 frame after transmitting ACK 224 to the requesting wireless station 210 in response to the FTM request 222 received from the requesting wireless station 210. The time t1A corresponds to the transmission time of the FTM Response A 226 frame sent by the responding wireless station 220, the time t2A corresponds to the reception time of the FTM Response A 226 frame captured by the requesting wireless station 210, the time t3A corresponds to the transmission time of the ACK A 228 frame in response to the FTM Response A 226 frame sent by the requesting wireless station 210, and t4A corresponds to the reception time of the ACK A 228 frame that is in response to the FTM Response A 226 frame captured by the responding wireless station 220.

The responding wireless station 220 provides additional FTM response frames (e.g., FTM Response B 230 at time t1B) to the requesting wireless station 210 that indicate additional respective transmission times and reception times of the previous FTM Response A 226 frame and the ACK A 228 frame. For example, FTM Response B 230 frame may include an indication in its payload of time t1A indicating the time at which FTM Response A 226 frame was sent and time t4A indicating the time at which ACK A 228 frame was received. The requesting wireless station 210 receives FTM Response B 230 at time t2B transmits additional ACKs (e.g., ACK B 228) at time t3B (received at time t4B) in response to these additional received FTM frames and captures additional respective reception times of the corresponding FTM frames and transmission times of the corresponding ACKs.

Note that alternative implementations of this FTM frame exchange may be performed that includes transmitting modified beacons, other signals, or other types of frames that include FTM related information and/or timestamps related information, and responses to such modified beacons, other signals, or other types of frames may also have various forms (e.g., acknowledgement (ACK), null data packet (NDP), other signals, or other types of frames). Furthermore, although only two sets of FTM responses and acknowledgements are illustrated in FIG. 2, in other implementations, any number of additional frame exchanges may be performed by requesting station 210 and responding station 220.

Upon receiving one or more responses, such as FTM Response A 226 and FTM Response B 230 to the FTM Request 222, requesting wireless station 210 can either calculate the time of flight (TOF) or round-trip delay (RTD/2) or forward the timing information to a cloud service, such as network service 160 including station position module 162, for the calculations to be performed. In either case, the time of flight between requesting wireless station 210 and responding wireless station 220 can be determined as illustrated in Equation 1.

$$TOF = \frac{[(t4A - t1A) - (t3A - t2A)]}{2} \quad (1)$$

As illustrated, the time of flight is equal to half of the difference between the time t4A when ACK A 228 frame was received by responding wireless station 220 and the time t1A when FTM Response A 226 was sent by responding wireless station 220 minus the amount of time it took for the requesting station to receive FTM Response A 226 frame and send ACK A 228 frame (i.e., t3A-t2A). A corresponding range or distance between requesting wireless station 210 and responding wireless station 220 can be determined using the calculated time of flight multiplied by the speed of light (e.g., approximately 300,000 kilometers per second). Additional time of flight calculations may be determined using subsequent frame exchange times (e.g., t1B, t2B, t3B, t4B associated with FTM Response B 230 frame and ACK B 228 frame) and an updated range between requesting wireless station 210 and responding wireless station 220 can be determined.

Requesting wireless station 210 can perform the above described FTM frame exchange procedure with any number of other responding wireless stations, such as others of wireless communication devices 120, 130, and 140, and can determine a corresponding range to each of those other responding wireless stations. Once having determined the range to at least three other responding wireless stations, requesting wireless station 210, or network service 160 running station position module 162, can use trilateration techniques to determine a position of the requesting wireless station 210 relative to the other responding wireless stations. If the absolute position of the responding wireless stations is known (e.g., latitude/longitude, GPS coordinates), then the absolute position of requesting wireless station 210 can be determined using the relative position.

Figure 3:
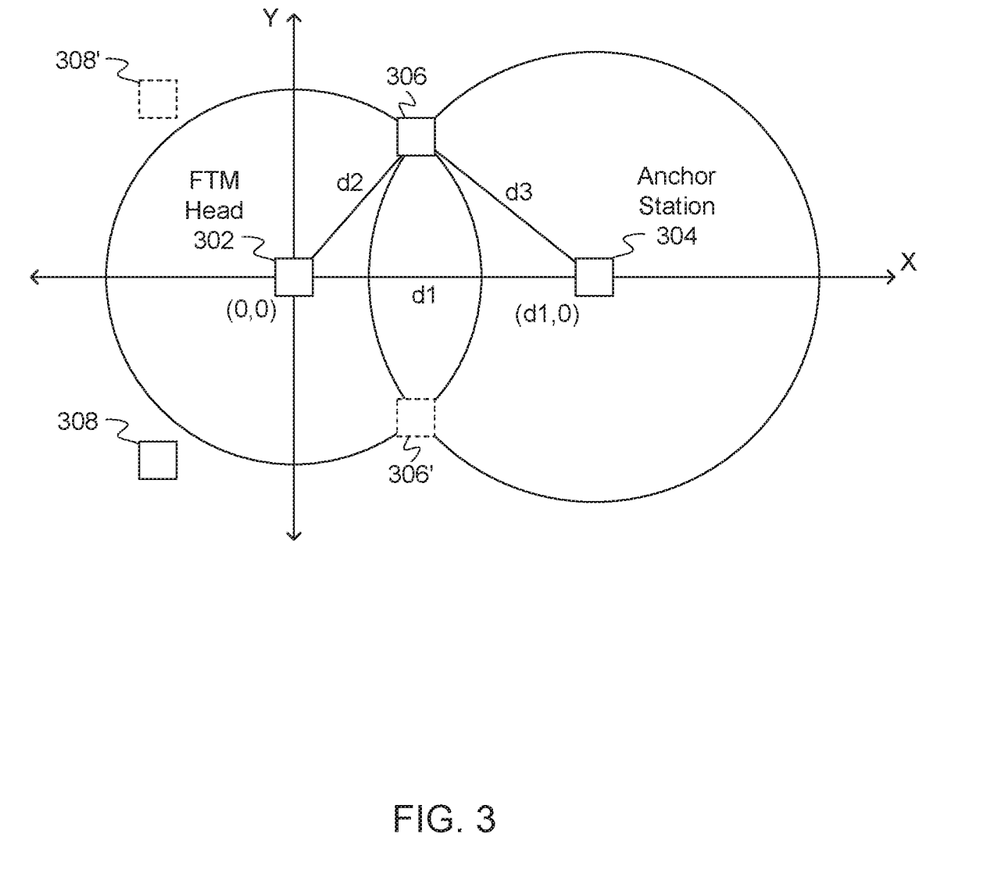
FIG. 3 is a graph illustrating a relative-position map of a plurality of wireless communication devices, according to an embodiment.

FIG. 3 is a graph illustrating a relative-position map of a plurality of wireless communication devices, according to an embodiment. In many circumstances, the absolute position of the responding wireless stations is not known, and thus station position module 162, or one of station position clients 164, can derive a relative position map of the wireless stations using the FTM distance information obtained above. After receiving an initiating command, e.g., from a user or from network service 160, each wireless station begins the FTM process to determine the distances between each other. For example, wireless communication devices 120, 130, and 140 may utilize wireless network connections 124, 134, and 144 to exchange FTM frames as described above with reference to FIG. 2. One of wireless communication devices 120, 130, and 140 is designated as the FTM head device 302. All of the other FTM participants (i.e., the remaining ones of wireless communication devices 120, 130, and 140) send the measured distance to the FTM head device 302. Depending on the embodiment, the FTM head device 302 can be selected or assigned, simply for the purpose of triggering the map drawing procedure.

In one embodiment, station position module 162, or one of station position clients 164, can first select an anchor pair of stations. In one embodiment, the anchor pair may be the pair of stations with the smallest distance variation. Each station in the system measures the distance with every other station, and the pair with the smallest distance variation may be the two stations for which the measurement value of the distance to the other station has the smallest discrepancy compared with other pairs in the system. For example, consider a situation where a first station measures a distance of 2.5 meters to a second station and the second station measures a distance of 2.6 meters to the first station. Assume the first station also measures a distance of 3.2 meters to a third station and the third station measures a distance of 3.4 meters to the first station. Thus, the first and third stations have a distance variation of 0.2 meters (3.4 meters-3.2 meters) while the first and second stations have a distance variation of 0.1 meters (2.6 meters-2.5 meters). Accordingly, in one embodiment, the first and second stations may be selected as the anchor pair rather than the first and third stations. In another embodiment, the anchor pair may be the pair of stations with the shortest distance between them. In another embodiment, the anchor pair may be assigned, either from the users or from the rank (computing power) order among all the participating stations. In another embodiment, the anchor pair may be the pair of stations closest to the access point or router. In another embodiment, the anchor pair may include the access point or router and one other closest station.

After identifying the anchor pair, station position module 162, or one of station position clients 164, can select one of the stations in the anchor pair to serve as the FTM head device 302. The other station in the anchor pair may be referred to herein as the anchor station 304. The FTM head device is configured to trigger the relative-position map drawing by demand or upon occurrence of another condition, to collect all the distance measurement values for the map drawing tasks, and to output the calculated relative positions to a display or to network service 160 for later rendering. In general, the FTM head device 302 should be one of wireless communication devices 120, 130, and 140, and should not include the wireless access point (e.g., network equipment 110). With the distance d1 known between FTM head device 302 and the anchor station 304 of the anchor pair, the anchor pair can be plotted on an X-Y coordinate system, as illustrated in FIG. 3. The designated FTM head device 302 can be plotted with a coordinate of (0,0) and the relative position of anchor station 304 can be assigned a coordinate (d1,0). The X-Y coordinate system assumes that all stations are at approximately the same elevation and, thus, does not consider a Z coordinate; although a three dimensional coordinate system could be used in other embodiments. In these embodiments where an X-Y-Z coordinate system is used, the anchor pair can be plotted such that the designated FTM head device 302 has a coordinate of (0,0,0) and the anchor station 304 can be assigned a coordinate (d1,0,0).

Based on the orientation of the anchor pair, the relative position of additional stations can be plotted on the X-Y coordinate system by calculating the intersections of two anchor-node-centered circles with a radius of the measured distance. For example, a third station 306 may perform the FTM procedure 200 to determine its range from each of FTM head device 302 (i.e., d2) and anchor station 304 (i.e., d3). A circle of radius d2 can be drawn around FTM head device 302 and a circle of radius d3 can be drawn around anchor station 304. The intersections of the two circles represent the possible positions of third station 306. Most of the time, the calculation of the position of third station 306 gives two results (i.e., on both sides of the anchor pair's line segment), because the measured FTM distance value does not contain direction information. Thus, with the representation of a relative coordinate system, the relative positions of the FTM stations can be mapped to both side of the X axis (e.g., 306 and 306'). In these embodiments where an X-Y-Z coordinate system is used, a sphere of radius d2 can be drawn around FTM head device 302, and a sphere of radius d3 can be drawn around anchor station 304. The intersections of the two spheres represent the possible positions of third station 306. Thus, the relative elevation difference between the third station 306 and the anchor pair can be accounted for in the relative position map.

Similarly, a fourth station 308 may perform the FTM procedure 200 to determine its range from each of FTM head device 302, anchor station 304, and third node 306. Using the same procedure, the relative position of the fourth station can be mapped to both side of the X axis (e.g., 308 and 308'). In one embodiment, user correction may be performed to select the appropriate position of the third node (i.e., 306 or 306') and the fourth node (i.e., 308 or 308') on the X-Y coordinate system or X-Y-Z coordinate system, as appropriate.

Figure 4:
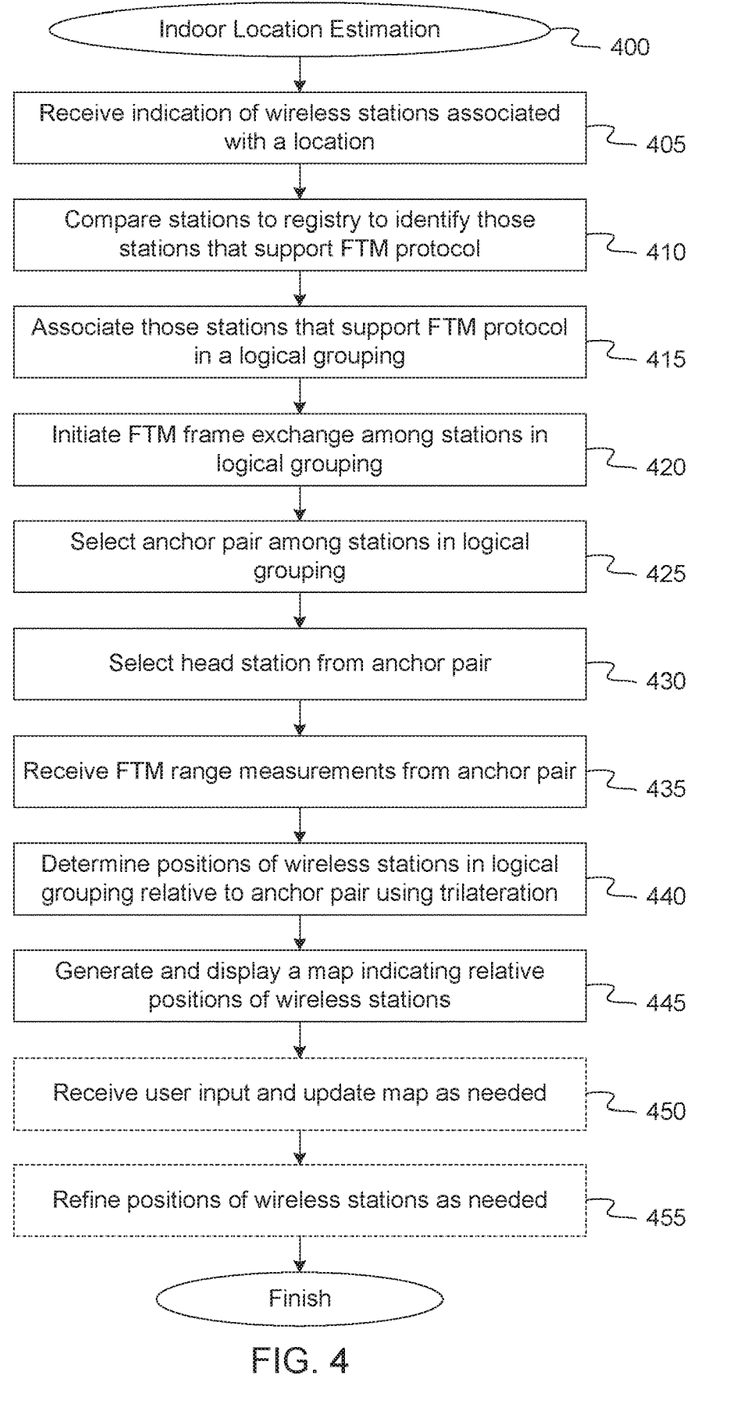
FIG. 4 is a flow diagram illustrating method of indoor location estimation of a wireless communication device, according to an embodiment.

FIG. 4 is a flow diagram illustrating method of indoor location estimation of a wireless communication device, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by station position module 162 running as part of network service 160 or by one of station position clients 164 running on wireless communication devices 120, 130, or 140, as shown in FIG. 1.

Referring to FIG. 4, at block 405, method 400 receives an indication of a plurality of wireless stations associated with a location (e.g., a venue). The venue may include, for example, some relatively small space, such as a house, apartment, store, etc., where the number of wireless network access points is generally going to be limited. This is in contrast to a larger public space, such as a shopping mall, school campus, commercial building, etc., where many different access points may be present. In one embodiment, as part of a registration phase, a user may provide an indication of the different wireless stations they have in their home. For example, the user may send media access control (MAC) addresses, product serial numbers, model numbers, or other unique identifiers of the wireless stations to station position module 162.

At block 410, method 400 compares the wireless stations to a registry of devices known to support the FTM protocol, in order to determine which devices at the venue support the FTM protocol. In one embodiment, station position module 162 maintains a registry, database, or other mapping of wireless stations known to support the FTM protocol. For example the registry may list either specific individual stations, or certain categories of stations (e.g., a particular model from a given manufacturer), along with an indication of whether or not they support the FTM protocol.

At block 415, method 400 associates those stations at the venue that support the FTM protocol with a logical grouping of stations. In one embodiment, using the mapping, station position module 162 can indicate to a certain requesting wireless station, which other wireless stations can serve as FTM responders for purposes of determining the location of the requesting station. In one embodiment, station position module 162 can form one or more FTM groups (i.e., logical groupings) including those wireless stations at the same venue that support the FTM protocol (e.g., can server as an FTM requestor, an FTM responder, or both) and share at least one communication band/channel (e.g., 2.4 Gigahertz, 5 Gigahertz) to enable communication between those wireless stations. The maximum bandwidth of the communication channels used by the wireless stations may also be considered when forming the logical grouping. For example, station position module 162 may add an indication (e.g., MAC address) of each wireless station determined to support the FTM protocol at block 410 to a database entry, list, array, set, or other grouping of devices associated with the venue. The wireless stations in the logical grouping can serve as a responding station (e.g., responding station 220) for any other wireless station in the logical grouping or otherwise making an FTM request (e.g., requesting station 210). Once a FTM group is formed, or at least once the support of the FTM protocol among other wireless stations is determined, station position module can provide an indication (e.g., the MAC address) of the plurality of wireless stations in the logical grouping to each of the plurality of wireless stations so that the wireless stations can perform the FTM frame exchange procedure, in order to determine the range between stations. With knowledge of the wireless stations in the logical grouping, the wireless stations can determine which stations can serve as a responding device in the FTM frame exchange procedure.

At block 420, method 400 initiates a FTM frame exchange among the stations in the logical grouping. In one embodiment, the FTM frame exchange is triggered in response to a user request (e.g., from a user of one of wireless communication devices 120, 130, or 140). In other embodiments, the FTM frame exchange is triggered by the occurrence of some other event, such as the passage of some period of time since a last FTM frame exchange was performed, the addition of a new station or access point to the network, etc. In response, one or more of the wireless stations may perform the FTM frame exchange procedure 200, as described above with respect to FIG. 2, which one or more other wireless stations. For example, in one embodiment, each wireless station in the group may perform the FTM frame exchange procedure 200 with each other wireless station in the group.

At block 425, method 400 selects an anchor pair of wireless stations from those in the logical grouping. In one embodiment, the anchor pair may be the pair of stations with the smallest distance variation. Each station in the system measures the distance with every other station, and the pair with the smallest distance variation may be the two stations for which the measurement value of the distance to the other station has the smallest discrepancy compared with other pairs in the system. In another embodiment, the anchor pair may be the pair of stations with the shortest distance between them. In another embodiment, the anchor pair may be assigned, either from the users or from the rank (computing power) order among all the participating stations. In another embodiment, the anchor pair may be the pair of stations closest to the access point or router. In another embodiment, the anchor pair may include the access point or router and one other closest station.

At block 430, method 400 selects one of the anchor pair of wireless stations to serve as a head station responsible for coordinating range measurement values using the FTM protocol among the wireless stations in the logical grouping. In one embodiment, station position module 162, or one of station position clients 164, can select one of the stations in the anchor pair to serve as the FTM head device 302. The other station in the anchor pair may be referred to herein as the anchor station 304. The FTM head device is configured to collect all the distance measurement values for the map drawing tasks, and to output the calculated relative positions to a display or to network service 160 for later rendering. In general, the FTM head device 302 should be one of wireless communication devices 120, 130, and 140, and should not include a wireless access point (e.g., network equipment 110).

At block 435, method 400 receives range measurement values from the head station, the range measurement values including a range measurement value from each wireless station in the logical grouping to each other wireless station in the logical grouping. The range measurement values indicate the distance between wireless stations, but do not include a direction component. Thus, station position module 162 cannot determine the relative position of the wireless stations from the range measurement values alone.

At block 440, method 400 determines a relative position of each wireless station relative to a position of the anchor pair using trilateration. The trilateration process is described in detail above with respect to FIG. 3. In general, however, after known the distance between the stations of the anchor pair, and the distance from another station to each of the stations of the anchor pair, station position module 162 can define circles centered around each of the stations of the anchor pair having radii of the respective distance of the other station being plotted. Station position module 162 can identify at least one position where the first circle and the second circle intersect. This position (or positions) represents possible locations of the other station. As a result, the determined relative position of each wireless station defines the measured distance between that station and other stations (e.g., the anchor pair) and the direction (i.e., orientation) relative to those other stations where the wireless station is located.

At block 445, method 400 generates a map indicating the position of the anchor pair and the relative position of each wireless station in the logical grouping. The anchor pair, and any other stations, can be plotted on an X-Y coordinate system, as illustrated in FIG. 3. The designated FTM head device 302 can be plotted with a coordinate of (0,0) and the anchor station 304 can be assigned a coordinate (d1,0). The X-Y coordinate system assumes that all stations are at approximately the same elevation and, thus, does not consider a Z coordinate; although a three dimensional coordinate system could be used in other embodiments.

At block 450, method 400 optionally receives user input confirming or adjusting the relative position of each wireless station updates the map to reflect the user input, as needed. Most of the time, the calculation of the position of a third station 306 gives two results (i.e., on both sides of the anchor pair's line segment), because the measured FTM distance value does not contain direction information. Thus, with the representation of a relative coordinate system, the relative positions of the FTM stations can be mapped to both side of the X axis (e.g., 306 and 306'). The received user input can clarify the correct orientation of the third station.

At block 455, method 400 optionally refines the positions of the wireless stations, as needed. In one embodiment, station position module 162 uses a Kalman filter model to refine the positions of the wireless stations. This may include determining a predicted future position of the wireless stations by extrapolating from past recorded direction and speed information, comparing the predicted future position to a subsequent relative position of the wireless stations, and determining a refined position of the wireless stations, wherein the refined position is based on a logical combination (e.g., an average) of the predicted future position and the subsequent relative position. Using the techniques describe above may provide a general estimate of the position of one or more wireless stations. Depending on the embodiment, the amount of error associated with this estimate may vary. Thus, in certain embodiments, a dynamic model may be used to make fine adjustments to the estimate by performing a real-time tracking of movement.

Assuming that z is the current state vector which consists of x and y, where x and y are a station's determined location coordinates. Under the further assumption that a station may move at a constant same speed v without acceleration, the x coordinate location over time (t) can be expressed as shown in Equation 2.

$$x(t+1)=x(t)+d\cdot\cos\theta \quad (2)$$

The location l of the station is function of speed, and the y coordinate location over time can be expressed as shown in Equation 3.

$$y(t+1)=y(t)+d\cdot\sin\theta \quad (3)$$

d is the current distance between stations determined via FTM measurement. The distance d can be expressed with the speed (v) and elapsed time ($\Delta t$).

The state vector as a function of time Z(t) for location x and y can be expressed as shown in Equation 4, where Q is the process noise covariance.

$$Z(t)=A\cdot Z(t-1)+V(t), V(t)\sim N(0,Q) \quad (4)$$

Matrix A shown below illustrates the location coordination with speed as a factor (x, y and v).

There is one more piece of information from FTM measurement, which can be expressed as shown in Equation 5.

$$\tilde{Z}(t)=H\cdot Z(t)+W(t), W(t)\sim N(0,R) \quad (5)$$

$\tilde{Z}(t)$ represents the obtained measurements from the FTM measurement. R is the measurement noise covariance. H is the observation matrix, which is simply the coordinates of the station in this measurement.

Two state matrices deduced from Z(t), $\hat{Z}(t)$ can be used for the estimation value from based on previous status and $\tilde{Z}(t)$ is the results of location coordination from measurement d.

There can be error from estimated location and measurement location, and the error term can be defined as shown in Equation 6.

$$\text{error}=\tilde{Z}(t)-\hat{Z}(t) \quad (6)$$

With $\hat{Z}(t)$ as the estimation from the previous information instead of Z(t), the error factor can be updated with the weight of optimized parameter k and expressed as shown in Equation 7.

$$\hat{Z}(t)=\hat{Z}(t-1)+k\cdot\text{error} \quad (7)$$

The goal is to reduce the error from the estimation and measurement to make the error as small as possible. Again, estimation is done from a trilateration algorithm which is $\tilde{Z}(t)$. $\hat{Z}(t)$ is estimated from previous results of Z(t−1) and finally Z(t) is updated from $\tilde{Z}(t)$, $\hat{Z}(t)$.

If error is 0, then $\hat{Z}(t)$ will be updated from $\hat{Z}(t-1)$ which is function of known parameters speed (v) and time-delta ($\Delta t$).

This model can be projected to a Kalman Filter to find out covariance of error. By getting covariance error, we can compensate Z(t) using estimation value $\hat{Z}(t)$, measurement value $\tilde{Z}(t)$.

To make a prediction of location based on previous location, use Equation (4) with following equation (8) and (9)

$$\hat{Z}(t) = A \cdot \hat{Z}(t-1) \quad (8)$$

$$P(t) = A \cdot P(t-1) \cdot A^T + Q \quad (9)$$

Here P(t) is the error covariance Matrix with Q(process noise covariance) as a factor. This equation (9) is from the Kalman equation.

This equation indicates that if we know the covariance of estimation, the next covariance is the function of Matrix A which is location coordination from speed (v) and elapsed time ($\Delta t$).

With this error covariance, we can get Kalman gain as shown in Equation 10.

$$K(t) = P(t) \cdot H^T \cdot (H \cdot P(t) \cdot H^T + R)^{-1} \quad (10)$$

This equation expresses that the Kalman gain depends on inverse of the measurement which is $\tilde{Z}(t)$. This Kalman gain will be multiplied by the equation (6).

The difference between Measurement and our Estimation will be multiplied with the amount of Kalman gain and this is the final Estimation as shown in Equation 11. The symbol "←" indicates an "update".

$$\hat{Z}(t) \leftarrow \hat{Z}(t) + K(t) \cdot \text{error} \quad (11)$$

Also, the estimation covariance P(t) can be updated with Kalman gain as shown in Equation 12.

$$P(t) \leftarrow (I - K(t) \cdot H) \cdot P(t) \quad (12)$$

Equation 4 can be rewritten in matrix form, as shown in Equations 13 and 14.

$$\begin{bmatrix} x_t \\ y_t \\ v_t \end{bmatrix} = \begin{bmatrix} 1 & 0 & \Delta t \cdot \cos\theta \\ 0 & 1 & \Delta t \cdot \sin\theta \\ 0 & 0 & 1 \end{bmatrix} \begin{bmatrix} x_{t-1} \\ x_{t-1} \\ v_{t-1} \end{bmatrix} + \begin{bmatrix} q_{11} & 0 & 0 \\ 0 & q_{22} & 0 \\ 0 & 0 & q_{33} \end{bmatrix} \quad (13)$$

where $$A = \begin{bmatrix} 1 & 0 & \Delta t \cdot \cos\theta \\ 0 & 1 & \Delta t \cdot \sin\theta \\ 0 & 0 & 1 \end{bmatrix}, Z = \begin{bmatrix} x \\ x \\ v \end{bmatrix}, V = \begin{bmatrix} q_{11} & 0 & 0 \\ 0 & q_{22} & 0 \\ 0 & 0 & q_{33} \end{bmatrix} \quad (14)$$

V matrix is the covariance from estimation of moving object. So, this value is dependent on $\Delta t$. If $\Delta t$ is small enough, then the variance value would be small, otherwise big.

For observation location estimation $\tilde{Z}(t)$ which is updated from the 802.11mc Triangulation, H can be defined as identity matrix in Equation 15 because x, y and v are independent.

$$H = \begin{bmatrix} 1 & 0 & 0 \\ 0 & 1 & 0 \\ 0 & 0 & 1 \end{bmatrix}, W = \begin{bmatrix} r_{11} & 0 & 0 \\ 0 & r_{22} & 0 \\ 0 & 0 & r_{33} \end{bmatrix} \quad (15)$$

W matrix consists of covariance of 802.11mc FTM estimation. This covariance value will be chosen based on the distance between each station's location. If distance of radius is covered by device, then the variance value would be small, otherwise the variance would be larger.

Figure 5:
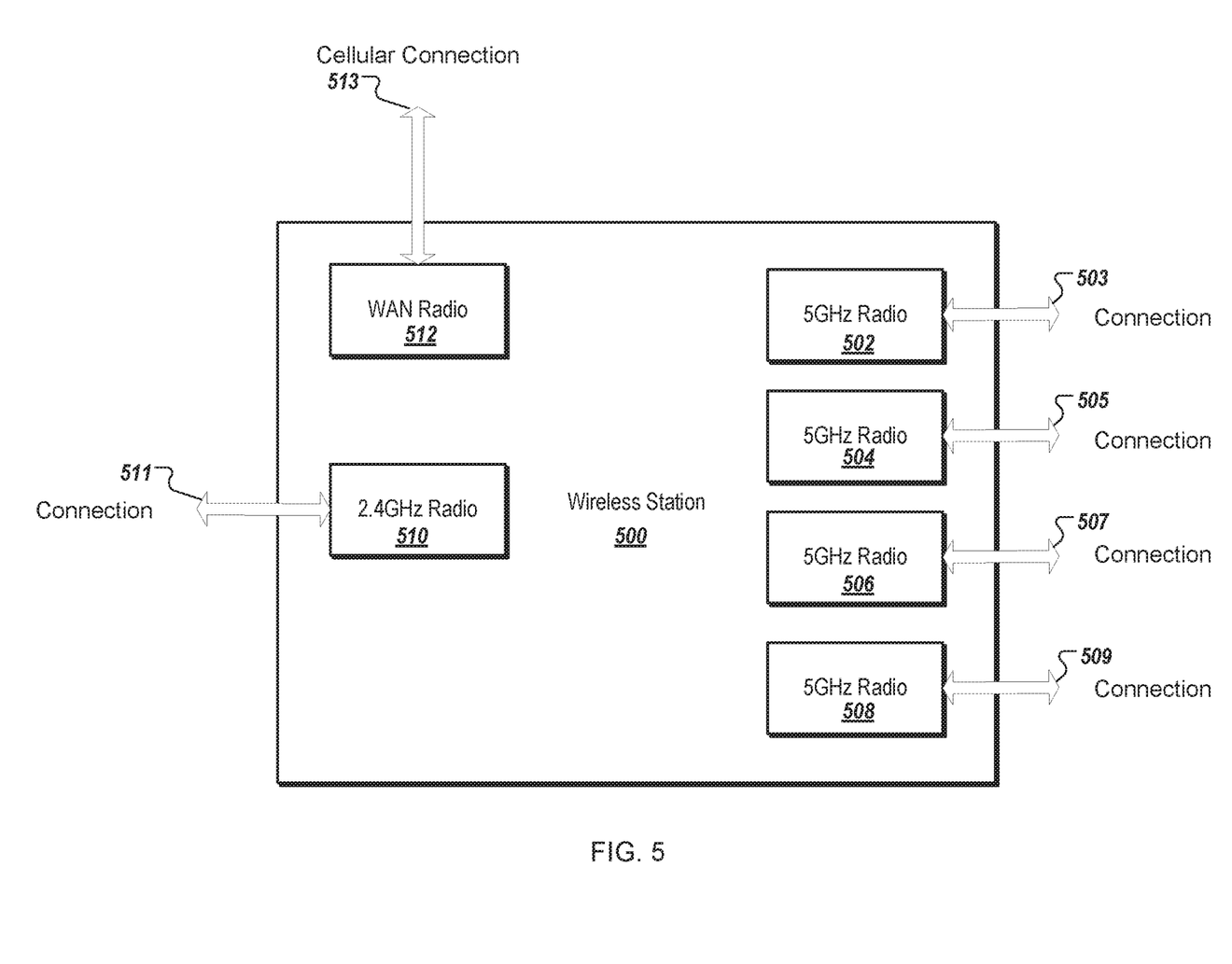
FIG. 5 is a block diagram of a wireless station with multiple radios according to one embodiment.

FIG. 5 is a block diagram of a wireless station 500 with multiple radios according to one embodiment. The wireless station 500 includes a first 5 GHz radio 502, a second 5 GHz radio 504, a third 5 GHz radio 506, a fourth 5 GHz radio 508, a 2.4 GHz radio 510, and a cellular radio 512. The first 5 GHz radio 502 creates a first wireless connection 503 between the wireless station 500 and another wireless station (not illustrated) in a WLAN network. The second 5 GHz radio 504 creates a second wireless connection 505 between the wireless station 500 and another wireless station (not illustrated) in the WLAN network. The third 5 GHz radio 506 creates a third wireless connection 507 between the wireless station 500 and another wireless station (not illustrated) in the WLAN network. The fourth 5 GHz radio 508 creates a fourth wireless connection 509 between the wireless station 500 and another wireless station (not illustrated) in the WLAN network. The 2.4 GHz radio 510 creates a wireless connection 511 between the wireless station 500 and a client consumption device (not illustrated) in the WLAN network. This wireless connection may be one of a second set of one or more WLAN connections that operate at a second frequency of approximately 2.4 GHz. The cellular radio 512 creates a cellular connection between the wireless station 500 and a device in a cellular network (not illustrated). In other embodiments, more than one 2.4 GHz radios may be used for more wireless connections. Alternatively, different number of 5 GHz radios may be used for more or less wireless connections with other wireless stations. In other embodiments, multiple cellular radios may be used to create multiple cellular connections.

In some embodiments, the wireless station 500 may be any one of the wireless communication devices described herein. Multiple network hardware devices are wirelessly connected through a network backbone formed by multiple wireless connections. These wireless connections are wireless connections between different pairs of the network hardware devices. These wireless connections may be a first set of WLAN connections that operate at a first frequency of approximately 5.0 GHz. The multiple network hardware devices may be wirelessly connected to one or more client consumption devices by one or more wireless connections. Also, the multiple network hardware devices may be wirelessly connected to a network control services device by cellular connections. Each network hardware device includes a cellular connection to a service hosted by a cloud computing system. The cellular connections may have lower bandwidths than the point-to-point wireless link.

In some embodiments, the wireless station 500 includes memory to store content files, control and command data, as well as the aggregate data described herein. The memory of the first network hardware device may be volatile memory, non-volatile memory, or a combination of both. When a content file is not stored in the memory or the storage of the wireless station 500, the wireless station 500 generates and sends a request to another station in the network. Intervening network hardware devices can make similar determinations to locate the content file in the network.

In a further embodiment, the wireless connections 503, 505, 507, 509 are WLAN connections that operate in a first frequency range and the connection 511 is a WLAN connection that operates in a second frequency range. In another embodiment, the wireless connections 503, 505, 507, 509 operate at a first frequency of approximately 5.0 GHz and the connection 511 operates at a second frequency of approximately 2.4 GHz.

Figure 6:
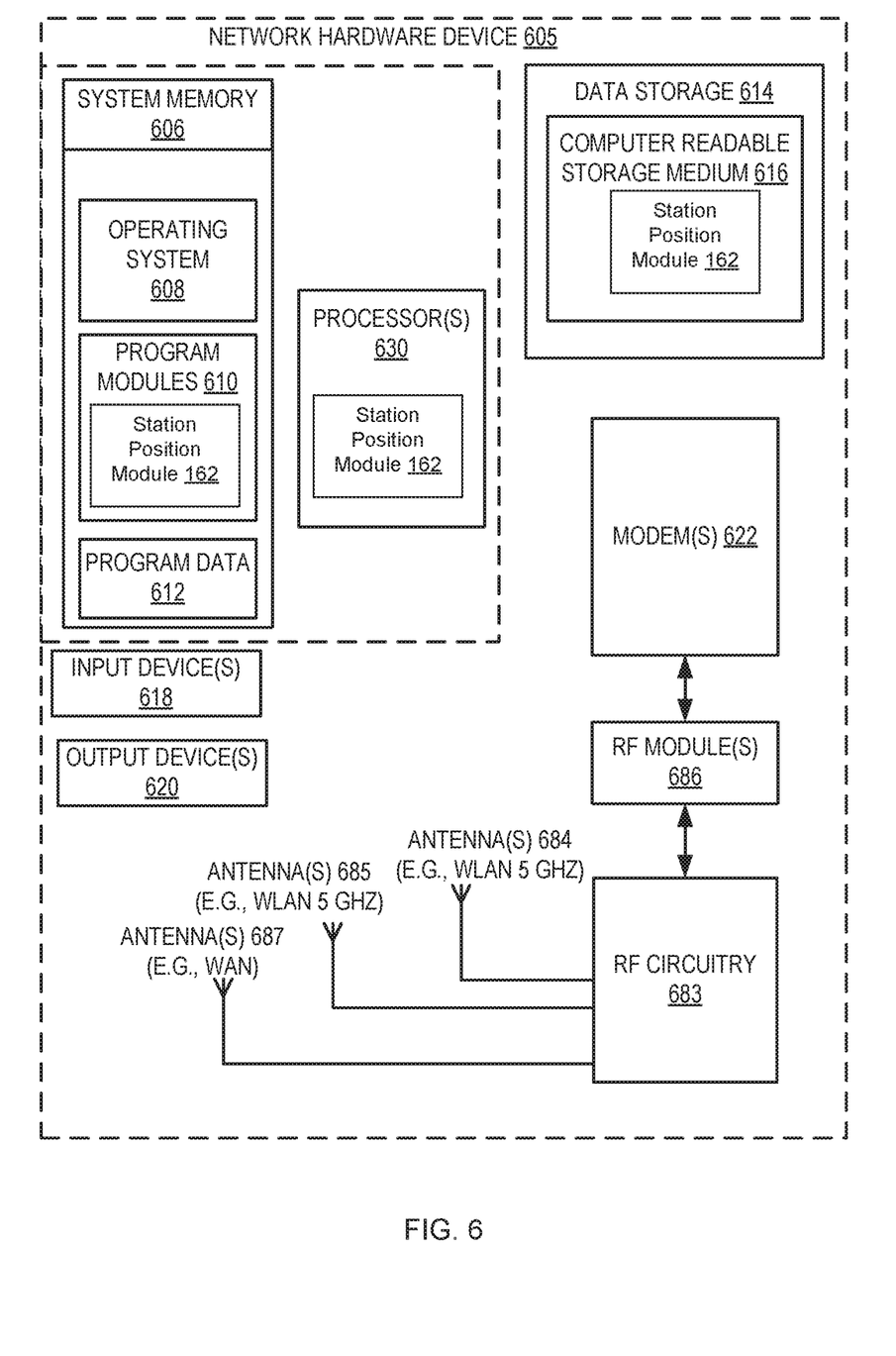
FIG. 6 is a block diagram of a network hardware device according to one embodiment.

FIG. 6 is a block diagram of a network hardware device 600 with a station position module 162 according to one embodiment. The network hardware device 600 may correspond to the network hardware device 110 or any of wireless communication devices 120, 130, and 140, or a server executing network service 160, as shown in FIG. 1. In another embodiment, the network hardware device 600 may correspond to the wireless station 500 of FIG. 5. Alternatively, the network hardware device 600 may be other electronic devices, as described herein.

The network hardware device 600 includes one or more processor(s) 630, such as one or more CPUs, microcontrollers, field programmable gate arrays, or other types of processors. The network hardware device 600 also includes system memory 606, which may correspond to any combination of volatile and/or non-volatile storage mechanisms. The system memory 606 stores information that provides operating system component 608, various program modules 610, program data 612, and/or other components. The program modules 610 may include instructions of the station position module 162. In one embodiment, the system memory 606 stores instructions of methods to control operation of the network hardware device 600. The network hardware device 600 performs functions by using the processor(s) 630 to execute instructions provided by the system memory 606.

The network hardware device 600 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein. Instructions for the program modules 610 may reside, completely or at least partially, within the computer-readable storage medium 616, system memory 606 and/or within the processor(s) 630 during execution thereof by the network hardware device 600, the system memory 606 and the processor(s) 630 also constituting computer-readable media. The network hardware device 600 may also include one or more input devices 618 (keyboard, mouse device, specialized selection keys, etc.) and one or more output devices 620 (displays, printers, audio output mechanisms, etc.).

The network hardware device 600 further includes a modem 622 to allow the network hardware device 600 to communicate via a wireless connections (e.g., such as provided by the wireless communication system) with other computing devices, such as remote computers, an item providing system, and so forth. The modem 622 can be connected to one or more RF modules 686. The RF modules 686 may be a WLAN module, a WAN module, PAN module, GPS module, or the like. The antenna structures (antenna(s) 684, 685, and 687) are coupled to the RF circuitry 683, which is coupled to the modem 622. The RF circuitry 683 may include radio front-end circuitry, antenna switching circuitry, impedance matching circuitry, or the like. In one embodiment, the RF circuitry 683 includes the RFFE circuitry with high selectivity performance as described in the various embodiments of FIGS. 5-12. The antennas 684 may be GPS antennas, NFC antennas, other WAN antennas, WLAN or PAN antennas, or the like. The modem 622 allows the network hardware device 600 to handle both voice and non-voice communications (such as communications for text messages, multimedia messages, media downloads, web browsing, etc.) with a wireless communication system. The modem 622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 622 may generate signals and send these signals to antenna(s) 684 of a first type (e.g., WLAN 5 GHz), antenna(s) 685 of a second type (e.g., WLAN 2.4 GHz), and/or antenna(s) 687 of a third type (e.g., WAN), via RF circuitry 683, and RF module(s) 686 as descried herein. Antennas 684, 685, and 687 may be configured to transmit in different frequency bands and/or using different wireless communication protocols. The antennas 684, 685, and 687 may be directional, omnidirectional, or non-directional antennas. In addition to sending data, antennas 684, 685, and 687 may also receive data, which is sent to appropriate RF modules connected to the antennas. One of the antennas 684, 685, 687 may be any combination of the antenna structures described herein.

In one embodiment, the network hardware device 600 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 622 is shown to control transmission and reception via antenna (684, 685, 687), the network hardware device 600 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of estimating relative positions of wireless stations, the method comprising:
   receiving a media access control (MAC) address for each of a plurality of wireless stations associated with a location;
   determining a first wireless station, a second wireless station, and a third wireless station of the plurality of wireless stations, wherein each of the first, the second and the third wireless stations support a Fine Timing Measurement (FTM) protocol, the first wireless station comprising a first user equipment (UE), the second wireless station comprising a second UE, and the third wireless station comprising at least one of a third UE or an access point device;
   forming a logical grouping including the first wireless station, the second wireless station, and the third wireless station;
   selecting the first wireless station and the second wireless station as an anchor pair of wireless stations;
   selecting the first wireless station to serve as a head station responsible for coordinating range measurements, using the FTM protocol, among the wireless stations in the logical grouping;
   receiving a plurality of range measurement values from the head station, the plurality of range measurement values including a range measurement value from each wireless station in the logical grouping to each other wireless station in the logical grouping;
   determining a position of the third wireless station relative to a position of the first wireless station and to a position of the second wireless station using trilateration; and
   generating a map indicating the position of the first wireless station, the position of the second wireless station, and the position of the third wireless station with respect to the first and the second wireless stations.

2. The method of claim 1, wherein the first wireless station to perform a first FTM frame exchange operation with the third wireless station to determine a first distance between the first wireless station and the third wireless station, wherein the second wireless station to perform a second FTM frame exchange operation with the third wireless station to determine a second distance between the second wireless station and the third wireless station, and wherein the position of the third wireless station is based on the first distance and the second distance.

3. The method of claim 1, further comprising:
   determining a future position of the third wireless station by extrapolating from past recorded direction and speed information pertaining to movement of the third wireless station;
   comparing the future position to a subsequent position of the third wireless station, the subsequent position determined using the FTM protocol; and
   determining an adjusted position of the one wireless station, wherein the adjusted position comprises an average of the future position and the subsequent position.

4. The method of claim 1, wherein the first wireless station and the second wireless station have one of: a smallest distance variation, a shortest distance between them, or are closest to the access point device at the location.

5. A computing device comprising:
   one or more processors; and
   memory to store computer-executable instructions that, if executed, cause the one or more processors to:
   identify a plurality of wireless stations that support a signal round-trip-time measurement protocol, the plurality of wireless stations comprising a first user equipment (UE), a second UE, and at least one of a third UE or an access point device;
   associate the plurality of wireless stations with one another to form a logical grouping of the plurality of wireless stations;

provide an indication of the plurality of wireless stations in the logical grouping to each of the plurality of wireless stations;

receive a first round-trip-time measurement value for a signal transmitted between a first wireless station and a second wireless station of the logical grouping, the first round-trip-time measurement value indicating a first distance between the first wireless station and the second wireless station;

receive a second round-trip-time measurement value for a signal transmitted between the first wireless station and a third wireless station of the logical grouping, the second round-trip-time measurement value indicating a second distance between the first wireless station and the third wireless station; and determine, using the first distance and the second distance, a position of the first wireless station relative to the second wireless station and the third wireless station.

6. The computing device of claim 5, wherein to form the logical grouping, the one or more processors to:

receive an indication of each of the plurality of wireless stations;

compare the indication to a registry of wireless stations known to support the signal round-trip-time measurement protocol; and associate those of the plurality of wireless stations found in the registry with the logical grouping.

7. The computing device of claim 5, wherein the signal round-trip-time measurement protocol comprises a Fine Timing Measurement (FTM) protocol.

8. The computing device of claim 7, wherein the first wireless station to perform a first FTM frame exchange operation with the second wireless station to determine the first distance between the first wireless station and the third wireless station, wherein the first wireless station to perform a second FTM frame exchange operation with the third wireless station to determine the second distance between the first wireless station and the third wireless station.

9. The computing device of claim 5, wherein the one or more processors further to:

receive a third round-trip-time measurement value for a signal transmitted between the second wireless station and the third wireless station, the third round-trip-time measurement value indicating a third distance between the second wireless station and the third wireless station.

10. The computing device of claim 9, wherein to determine the position of the first wireless station relative to the second wireless station and the third wireless station, the one or more processors to:

define a coordinate system comprising a first axis and a second axis;

define a position of the second wireless station at an intersection of the first axis and the second axis;

define a position of the third wireless station on the first axis spaced away from the intersection by an amount representing the third distance;

define a first circle centered at the position of the second wireless station, the first circle having a radius representing the first distance;

define a second circle centered at the position of the third wireless station, the second circle having a radius representing the second distance; and identify at least one position where the first circle and the second circle intersect, the at least one position representing the position of the first wireless station.

11. The computing device of claim 10, wherein the one or more processors further to:

generate a map indicating the position of the first wireless station relative to the second wireless station and the third wireless station using the coordinate system;

receive user input confirming or adjusting the position of the first wireless station; and update the map to reflect the user input.

12. The computing device of claim 11, wherein the one or more processors further to:

determine a future position of the first wireless station by extrapolating from past recorded direction and speed information pertaining to the first wireless station;

compare the future position to a subsequent position of the first wireless station, the subsequent position determined using the signal round-trip-time measurement protocol; and determine a refined position of the first wireless station, wherein the refined position is based on a logical combination of the future position and the subsequent position.

13. A method comprising:

identifying a plurality of wireless stations that support a signal round-trip-time measurement protocol, the plurality of wireless stations comprising a first user equipment (UE), a second UE, and at least one of a third UE or an access point device;

associating the plurality of wireless stations with one another to form a logical grouping of the plurality of wireless stations;

providing an indication of the plurality of wireless stations in the logical grouping to each of the plurality of wireless stations;

receiving a first round-trip-time measurement value for a signal transmitted between a first wireless station and a second wireless station of the logical grouping, the first round-trip-time measurement value indicating a first distance between the first wireless station and the second wireless station;

receiving a second round-trip-time measurement value for a signal transmitted between the first wireless station and a third wireless station of the logical grouping, the second round-trip-time measurement value indicating a second distance between the first wireless station and the third wireless station; and determining, using the first distance and the second distance, a position of the first wireless station relative to the second wireless station and the third wireless station.

14. The method of claim 13, wherein forming the logical grouping comprises:

receiving an indication of each of the plurality of wireless stations;

comparing the indication to a registry of wireless stations known to support the signal round-trip-time measurement protocol; and associating those of the plurality of wireless stations found in the registry with the logical grouping.

15. The method of claim 13, wherein the signal round-trip-time measurement protocol comprises a Fine Timing Measurement (FTM) protocol.

16. The method of claim 15, wherein the first wireless station to perform a first FTM frame exchange operation with the second wireless station to determine the first distance between the first wireless station and the third wireless station, wherein the first wireless station to perform a second FTM frame exchange operation with the third wireless station to determine the second distance between the first wireless station and the third wireless station.

17. The method of claim 13, further comprising:
receiving a third round-trip-time measurement value for a signal transmitted between the second wireless station and the third wireless station, the third round-trip-time measurement value indicating a third distance between the second wireless station and the third wireless station.

18. The method of claim 13, wherein determining the position of the first wireless station relative to the second wireless station and the third wireless station comprises:
defining a coordinate system comprising a first axis and a second axis;
defining a position of the second wireless station at an intersection of the first axis and the second axis;
defining a position of the third wireless station on the first axis spaced away from the intersection by an amount representing the third distance;
defining a first circle centered at the position of the second wireless station, the first circle having a radius representing the first distance;
defining a second circle centered at the position of the third wireless station, the second circle having a radius representing the second distance; and
identifying at least one position where the first circle and the second circle intersect, the at least one position representing the position of the first wireless station.

19. The method of claim 18, further comprising:
generating a map indicating the position of the first wireless station relative to the second wireless station and the third wireless station using the coordinate system;
receiving user input confirming or adjusting the position of the first wireless station; and
updating the map to reflect the user input.

20. The method of claim 19, further comprising:
determining a future position of the first wireless station by extrapolating from past recorded direction and speed information pertaining to the first wireless station;
comparing the future position to a subsequent position of the first wireless station, the subsequent position determined using the signal round-trip-time measurement protocol; and
determining a refined position of the first wireless station, wherein the refined position is based on a logical combination of the future position and the subsequent position.

\* \* \* \* \*